(12) United States Patent
Kurita

(10) Patent No.: US 7,161,624 B1
(45) Date of Patent: Jan. 9, 2007

(54) REMOTE CONTROL PAN HEAD SYSTEM

(75) Inventor: Kazuyuki Kurita, Omiya (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 09/550,278

(22) Filed: Apr. 14, 2000

(30) Foreign Application Priority Data

Apr. 16, 1999 (JP) .................................. 11-108889

(51) Int. Cl.
*H04N 5/232* (2006.01)

(52) U.S. Cl. .................. 348/211.99; 348/211.4

(58) Field of Classification Search ..............................
348/211.1–211.14, 211.2, 211.4, 211.7–14, 348/211.8, 211.9, 211.11, 211.99, 143, 211.3; 354/81

See application file for complete search history.

(56) References Cited

U.S. PATENT DOCUMENTS

| | | | | |
|---|---|---|---|---|
| 5,450,140 | A | * | 9/1995 | Washino .................... 348/722 |
| 5,515,099 | A | * | 5/1996 | Cortjens et al. ........... 348/14.1 |
| 5,523,783 | A | * | 6/1996 | Cho ............................ 348/157 |
| 5,583,565 | A | * | 12/1996 | Cortjens et al. ........... 348/14.1 |
| 5,598,209 | A | * | 1/1997 | Cortjens et al. ....... 348/211.12 |
| 5,627,616 | A | * | 5/1997 | Sergeant et al. ............ 396/427 |
| 5,745,223 | A | * | 4/1998 | Ikeda ........................ 356/4.01 |
| 5,815,080 | A | | 9/1998 | Taguchi |
| 5,838,250 | A | * | 11/1998 | Maekawa .................... 348/143 |
| 6,226,035 | B1 | * | 5/2001 | Korein et al. ............... 348/335 |
| 6,515,689 | B1 | * | 2/2003 | Terashima .................. 715/856 |
| 6,670,984 | B1 | * | 12/2003 | Tanaka et al. .............. 348/159 |

FOREIGN PATENT DOCUMENTS

EP 0 895 421 A2 2/1999

\* cited by examiner

*Primary Examiner*—Vivek Srivastava
*Assistant Examiner*—Kelly Jerabek
(74) *Attorney, Agent, or Firm*—Birch, Stewart, Kolasch & Birch, LLP.

(57) ABSTRACT

In a remote control pan head system, communication data is outputted from an operation unit and is inputted to a system controller via a modem, a general communication line and another modem. The system controller recognizes a data format of the inputted communication data. If the data format differs from the data format for the communication of a pan head, the data format of the communication data is converted into the data format that conforms with the data format for the pan head, and the converted communication data is transmitted to the pan head. Thus, the remote control pan head can be controlled even if data formats of communication data differ between the operation unit and the remote control pan head.

13 Claims, 2 Drawing Sheets

REMOTE CONTROL PAN HEAD SYSTEM

BACKGROUND OF THE INVENTION

1. Field of the Invention

The present invention relates to a remote control pan head system, more particularly to a remote control pan head system that controls operations of a remote control pan head and a camera mounted in the remote control pan head in accordance with a control signal transmitted from a pan head controller.

2. Description of Related Art

A remote control pan head is constructed in such a manner that a body of the remote control pan head, which is named a head, supports a housing, which houses a TV camera, and the housing is panned and tilted with motors so as to change the shooting direction of the TV camera. When installed at an outdoor location, the remote control pan head is connected with an operation unit via a general telephone line and so forth, and various data is exchanged between the operation unit and the remote control pan head through serial communications. An operation by the operator at the operation unit is thereby transmitted as a control signal to the remote control pan head, and respective operations of the remote control pan head and the TV camera are executed in accordance with the control signal.

Such exchanges of data between the operation unit and the remote control pan head is performed by a communication of data formats, each of which is specified differently system by system. However, a new data format has been required to be designed because the functions of the systems have improved and an old data format is not applicable to the new system. In such cases, communication with the old data format is not possible, and maintaining a compatibility between the new and old systems is not possible.

SUMMARY OF THE INVENTION

The present invention has been developed in view of the above-described circumstances, and has as its object the provision of a remote control pan head system that can control a remote control pan head with an operation unit even if data formats of communication data differ between the operation unit and the remote control pan head.

In order to achieve the above-described object, the present invention is directed to a remote control pan head system, comprising: an operation part which outputs a control signal to a remote control pan head in which a camera is mounted, at least one of the remote control pan head and the camera being controlled with the control signal; and a data converter which converts a communication data outputted from the operation part including the control signal into a data format that conforms with a data format for the remote control pan head, and transmits the converted communication data to the remote control pan head.

According to the present invention, the communication data transmitted from the operation part is converted into a data format that conforms with the data format of the remote control pan head before transmitting the data to the remote control pan head; thus the operation part can control the remote control pan head even if the communication data outputted from the operation part differs from the data format that is acceptable by the remote control pan head. Therefore, a remote control pan head that communicates in a new data format can be operated using an operation part that communicates in an old data format; conversely, a remote control pan head that communicates in an old data format can be operated using an operation part that communicates in a new data format.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

Hereunder a preferred embodiment of a remote control pan head system of the present invention will be described in detail according to the accompanying drawings.

Figure 1:
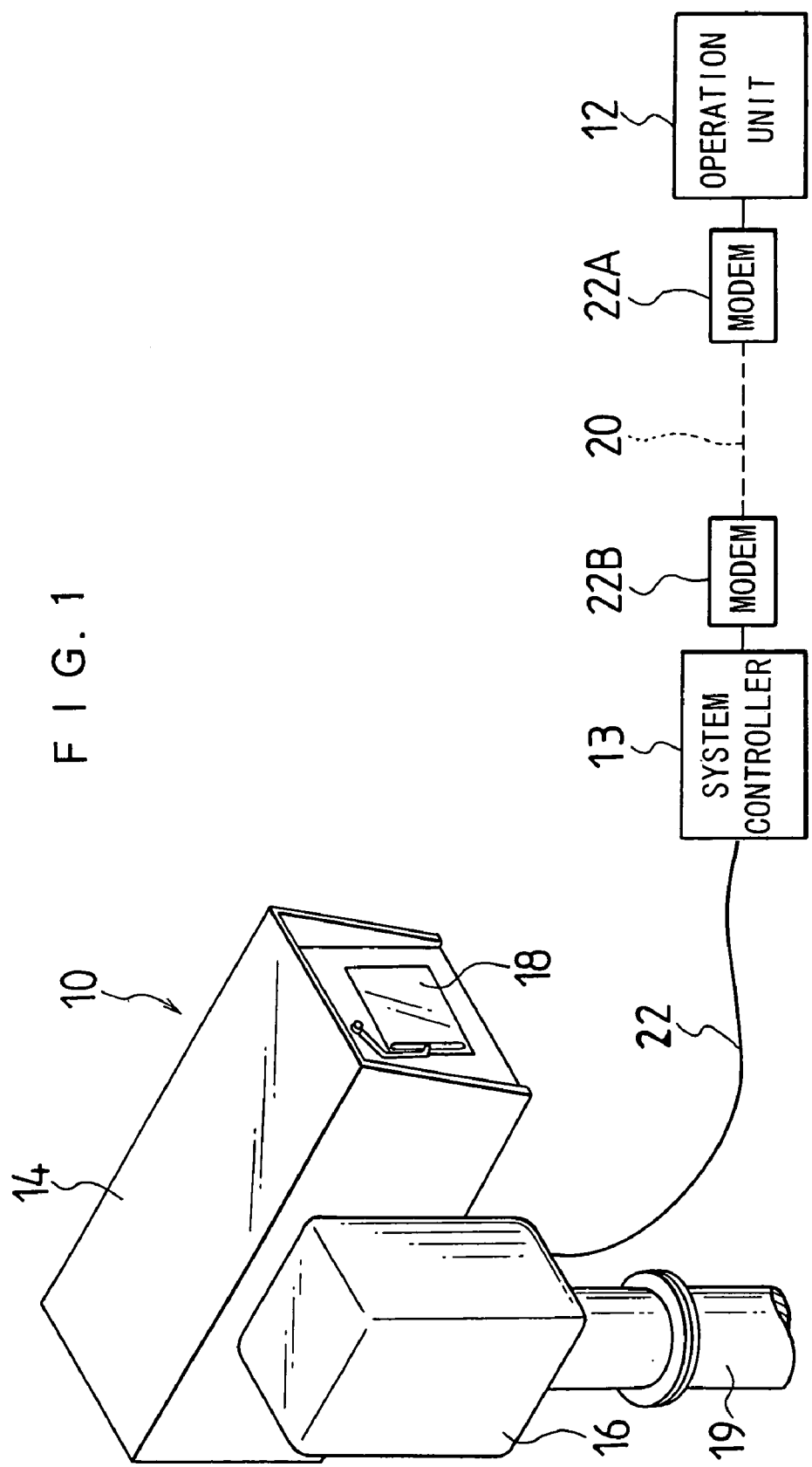
FIG. 1 is a view of the entire structure of the remote control pan head system according to an embodiment of the present invention.

FIG. 1 is a view of a remote control pan head system according to an embodiment of the present invention. As shown in FIG. 1, the remote control pan head system comprises a remote control pan head 10 (hereunder simply referred to as a pan head 10), an operation unit 12, and a system controller 13.

The pan head 10 comprises a housing 14, which houses a TV camera 46 (see FIG. 2), and a pan head main body 16, which supports the housing 14. The housing 14 is provided with a transparent front window 18 at the front thereof. The TV camera 46 housed in the housing 14 can shoot a scene, which is external to the housing 14, through the front window 18. The housing 14 is supported on one of its sides by a tilt axis (not shown), which is extended from the main body 16, and the main body 16 of the pan head has a built-in tilt motor 44 (see FIG. 2) for rotating the tilt axis. The entire main body 16 is supported by a pan axis 19, which is fixed to a mounting stage (not shown). The main body 16 has a built-in pan motor 42 (see FIG. 2) for rotating the main body 16 on the pan axis 19. Thus, driving the tilt motor 44 and the pan motor 42 results in the housing 14 to be tilted or panned, thereby the shooting direction (tilt position and pan position) of the camera 46 is moved.

The operation unit 12 transmits a control signal to instruct respective operations to the pan head 10 and the TV camera 46 mounted in the pan head 10. The operation unit 12 is provided with operation members of respective types, such as a joystick for controlling a pan position and a tilt position of the TV camera 46, control dials for controlling a focus position and a zoom position of the TV camera 46, and so forth. The operation unit 12 is connected with the system controller 13 via a general communication line (e.g., a telephone line) 20 and the like, and also connected to the pan head 10 with a communication cable 22 via the system controller 13. The operation unit 12 generates, as communication data, the control signal in accordance with the operation of the above-mentioned operating members, and transmits the control signal to the pan head 10 via the communication line 20 and the system controller 13. Modems 22A and 22B control communication through the communication line 20.

The system controller 13 was conventionally a system to supply electricity to the pan head 10 and to convert a level of the communication data; however, the system controller 13 in the present embodiment has a function to conform a data format of the communication data between the operation unit 12 and the remote control pan head 10. The conforming function will be described later.

Figure 2:
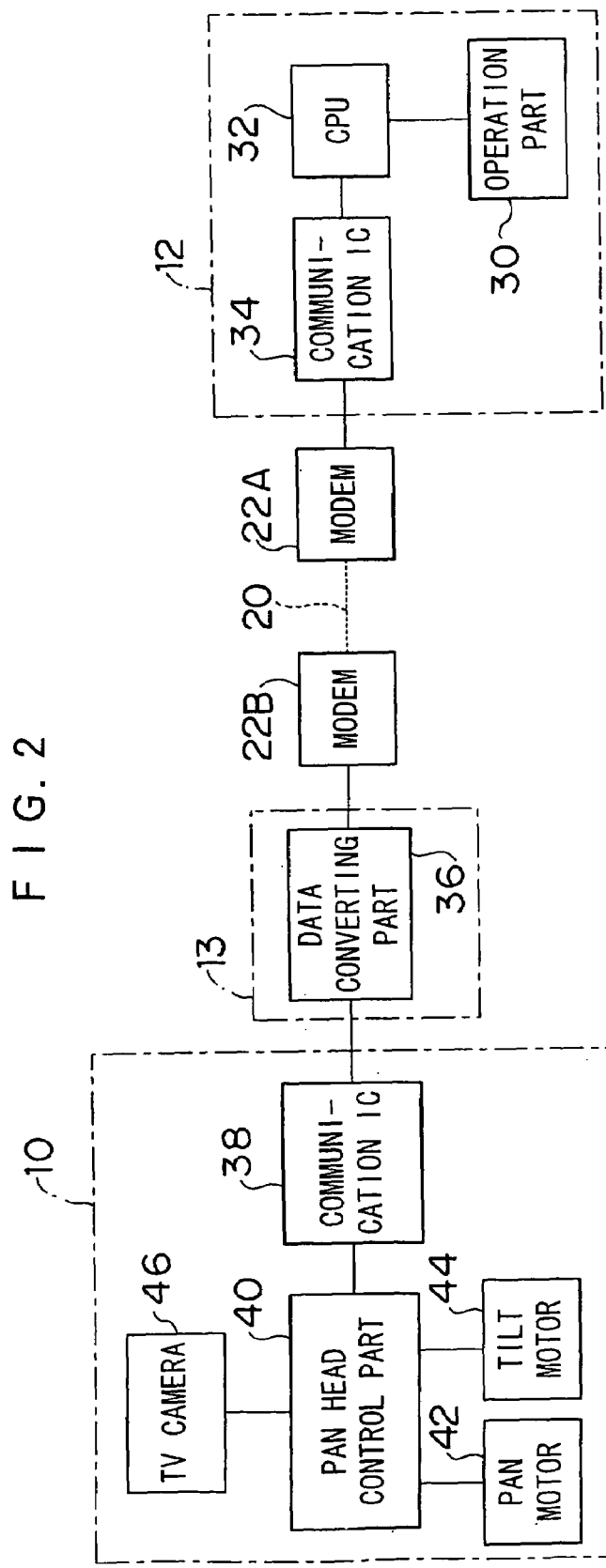
FIG. 2 is a block diagram showing the constitution of the remote control pan head system in FIG. 1.

FIG. 2 is a block diagram of the constitution of the remote control pan head system. As shown in FIG. 2, the operation of an operation part 30, which comprises the respective operation members in the operation unit 12, is detected by a CPU 32, and the control signal corresponding to the operation is outputted from the CPU 32 to a communication IC 34. The communication IC 34 converts the control signal into the communication data in the data format, which will be later described, and transmits the converted control signal to the modem 22A through serial communication. The communication data, transmitted to the modem 22A, is then transmitted to a data converting part 36 of the system controller 13 via the communication line 20 under control of the modems 22A and 22B.

The data converting part 36 is a circuit that is program-activated by software. The data converting part 36 automatically recognizes the data format of the communication data received from the operation unit 12 as described above in a method which will later be described, and then automatically converts the received data into the format that conforms with the data format of the pan head 10. The description will be omitted on the functions of the system controller 13 other than converting the data formats.

A recognition method of the data formats for the communication data is, for example, that: correspondence of data communication speeds to the data formats of operation units which would be used are beforehand recorded; framing errors caused by the difference of the data communication speeds accompanied by the difference in data formats are sequentially detected; the data communication speed of the communication data that is transmitted from the operation unit is thereby determined; and the data format is consequently recognized with reference to the data communication speed. However, a method to recognize the data format of the communication data is not restricted to the method exemplified above. For example, a function for notifying the communication speed of the modem 22B may be advantageously used in order to determine the data communication speed; alternatively, a type of data format may be recognized with reference to characteristics of respective data formats.

The communication data, which has been converted by the data converting part 36 into the data format conforming with the data format of the pan head 10, is transmitted to a communication IC 38 of the pan head 10, and the control signal according to the operation of the operation part 30 of the operation unit 12 is inputted from the communication IC 38 to a pan head control part 40. Then, the pan head control part 40 pans and tilts the TV camera 46 by driving the pan motor 42 and the tilt motor 44 in accordance with the control signal, and at the same time transmits a command to the TV camera 46 so as to execute the operation for controlling focus, zoom, and so forth.

The description above is only for the case in which the communication data are transmitted from the operation unit 12 to the pan head 10. However, respective types of information can also be transmitted from the pan head 10 to the operation unit 10; likewise, the communication data, transmitted from the pan head 10, are converted at the data converting part 36 into the data format that conforms with the data format of the operation unit 12, and then transmitted to the operation unit 12.

Explaining an operation of the remote control pan head system constructed as described above, two operation units A and B of which communication data formats differ are assumed to be connectable to the pan head 10 via the communication line 20. For example, the operation unit A performs a serial communication by a character unit (character-based communication) corresponding to the data format for the communication of the pan head 10; on the other hand, the operation unit B performs a serial communication by a bit unit (bit-based communication) differing from the data format for the communication of the pan head 10.

If the operation unit A is connected with the pan head 10 via the communication line 20, the communication data transmitted from the operation unit A is inputted to the data converting part 36 of the system controller 13 via the communication line 20. Then, the data format of the communication data is determined in the data converting part 36 in the method described above. In this case, the communication data inputted to the data converting part 36 corresponds to the data format for the communication of the pan head 10 (character-based), thus the communication data are transmitted to the pan head 10 as they are, that is, the character-based data.

If the operation unit B is connected with the pan head 10 via the communication line 20, the communication data transmitted from the operation unit B is inputted to the data converting part 36 of the system controller 13 via the communication line 20. Then, the data format of the communication data is determined in the data converting part 36. In this case, the data format of the communication data transmitted from the operation unit B is bit-based, and the data format does not correspond to the character-based data format for the communication of the pan head 10. Hence, the communication data transmitted from the operation unit B are converted from the bit-based data format into the data format that conforms with the data format of the pan head 10, that is, the character-based format and then transmitted to the pan head 10.

Thus, the pan head 10 can be controlled by the operation unit with a different data format; for example, the pan head 10 that communicates in a new data format can be controlled using the operation unit that communicates in an old data format, and vice-versa, is also possible.

In the above-described embodiment, the data converting part 36 for converting the data format is arranged in the system controller 13 between the communication line 20 and the pan head 10; however, such arrangement is not restricted. For example, the data converting part 36 may be arranged separately from the system controller 13, or arranged at the side of the operation unit 12 with respect to the communication line 20, or provided in the pan head 10.

Further, in the above-described embodiment, the data format of the communication data transmitted from the operation unit is automatically recognized in the data converting part 36, and the data format is automatically converted into the data format that conforms with the data format of the pan head 10; however the method is not restricted to that. The user may designate a type of data format of the communication data to be transmitted from the operation unit in the data converting part 36 through a switching device, and then the data converting part 36 may convert the data format into the data format that conforms with the data format of the pan head 10 in accordance with the designation by the user.

Furthermore, the data format of the communication of the pan head 10 may be designated by the user through a switching device, and the communication data transmitted from the operation unit are converted into the data format for the communication of the pan head that is designated by the user, so as to be applicable to a number of pan heads.

As described above, according to the remote control pan head system of the present invention, the communication data transmitted from the operation part are converted into the data format that conforms with the data format of the remote control pan head; thus the remote control pan head can be controlled by the operation part even if the communication data outputted from the operation part differ from the data format that is acceptable by the remote control pan head. Thus, a remote control pan head of a system that communicates in a new data format can be operated using the operation part of a system that communicates in an old data format; conversely, the remote control pan head that communicates in an old data format can be controlled using the operation part that communicates in a new data format.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A remote control pan head system of a TV camera, comprising:
   an operation part which outputs a control signal to a remote control pan head in which a camera is mounted, at least one of the remote control pan head and the camera being controlled with the control signal and said control signal being data for directly controlling at least one of the remote control pan head and the camera;
   a data converter which detects a data format of a communication data outputted from the operation part, determines whether or not the data format of the communication data differs from a data format for the remote control pan head, converts the communication data outputted from the operation part including the control signal into a data format used in serial communication which conforms with the data format for the remote control pan head if it is determined that the data format of the communication data differs from the data format for the remote control pan head and transmits the converted communication data to the remote control pan head, and transmits the communication data to the remote control pan head without conversion if it is determined that the data format of the communication data does not differ from the data format for the remote control pan head; and
   first and second modems connected with each other via a general communication line,
   wherein the control signal outputted by the operation part is transmitted to the first modem, then to the second modem, and then to the data converter.

2. The remote control pan head system of a TV camera according to claim 1, wherein the data converter comprises a recognition device which automatically recognizes a type of data format of the communication data outputted from the operation part.

3. The remote control pan head system of a TV camera according to claim 1, wherein the data converter comprises a switching device which is operated by a user to designate a type of data format of the communication data outputted from the operation part.

4. The remote control pan head system of a TV camera according to claim 1, wherein the data format from the communication data outputted from the operation part is a bit-based communication.

5. The remote control pan head system of a TV camera according to claim 1, wherein the data format from the communication data outputted from the operation part is a character-based communication.

6. The remote control pan head system of a TV camera according to claim 1, wherein the general communication line is a telephone line.

7. A remote control pan head system comprising:
   an operation unit, said operation unit including at least two different operation parts that each output a distinct control signal to a remote control pan head in which a camera is mounted, at least one of the remote control pan head and the camera being controlled with the distinct control signal and said control signal being data for directly controlling at least one of the remote control pan head and the camera;
   a data converter which detects a data format of a communication data outputted from each of the operation parts, determines whether or not the data format of the communication data differs from a data format for the remote control pan head, converts the communication data outputted from the operation parts including the control signal into a data format used in serial communication which conforms with the data format for the remote control pan head if it is determined that the data format of the communication data differs from the data format for the remote control pan head and transmits the converted communication data to the remote control pan head, and transmits the communication data to the remote control pan head without conversion if it is determined that the data format of the communication data does not differ from the data format for the remote control pan head; and
   first and second modems connected with each other via a general communication line,
   wherein the control signals outputted by the operation parts are transmitted to the first modem, then to the second modem, and then to the data converter.

8. The remote control pan head system according to claim 7, wherein the data converter comprises a recognition device which automatically recognizes a type of data format of the communication data outputted from the operation part.

9. The remote control pan head system according to claim 7, wherein the data converter comprises a switching device which is operated by a user to designate a type of data format of the communication data outputted from the operation part.

10. The remote control pan head system according to claim 7, wherein the data format from the communication data outputted from at least one of the operation parts is a bit-based communication.

11. The remote control pan head system according to claim 7, wherein the data format from the communication data outputted from at least one of the operation parts is a character-based communication.

12. The remote control pan head system according to claim 7, further comprising a pan head, said pan head including
   a TV camera,
   a pan head control part,
   a pan motor,
   a tilt motor, and
   a communication integrated circuit operatively connected to the pan head control part, wherein the pan head control part is operatively connected to the TV camera and controls an operation of the pan motor and the tilt motor.

13. The remote control pan head system according to claim 7, wherein the general communication line is a telephone line.

* * * * *